(12) United States Patent
Kelley et al.

(10) Patent No.: US 7,916,157 B1
(45) Date of Patent: Mar. 29, 2011

(54) SYSTEM AND METHODS FOR SELECTIVE ZOOM RESPONSE BEHAVIOR

(75) Inventors: Yohko A. F. Kelley, Woodinville, WA (US); Benjamin P. Bauermeister, Seattle, WA (US); Michael S. De Laurentis, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 293 days.

(21) Appl. No.: 11/204,760

(22) Filed: Aug. 16, 2005

(51) Int. Cl.
*G09G 5/00* (2006.01)

(52) U.S. Cl. ................ 345/660; 345/619; 345/661

(58) Field of Classification Search .......... 345/113, 345/118, 127, 130, 418, 434, 439, 619, 660, 345/661, 662, 802; 395/340, 342
See application file for complete search history.

(56) References Cited

U.S. PATENT DOCUMENTS

| | | | | |
|---|---|---|---|---|
| 5,699,535 | A * | 12/1997 | Amro ........................ | 715/800 |
| 6,304,271 | B1 * | 10/2001 | Nehme ...................... | 345/620 |
| 7,197,718 | B1 * | 3/2007 | Westerman et al. ........ | 715/801 |
| 7,197,719 | B2 * | 3/2007 | Doyle et al. ............... | 715/801 |
| 7,213,214 | B2 * | 5/2007 | Baar et al. ................. | 715/801 |
| 2002/0109680 | A1 * | 8/2002 | Orbanes et al. ............ | 345/418 |
| 2002/0180801 | A1 * | 12/2002 | Doyle et al. ............... | 345/802 |
| 2005/0035964 | A1 * | 2/2005 | Heenan ..................... | 345/420 |
| 2005/0195154 | A1 * | 9/2005 | Robbins et al. ............ | 345/156 |

OTHER PUBLICATIONS

Julia Layton, How Mapquest works, Mapquest version 2005, pp. 1-12.*
Mapquest snapshot Version 2004.*

* cited by examiner

*Primary Examiner* — Amare Mengistu
*Assistant Examiner* — Aaron M Guertin
(74) *Attorney, Agent, or Firm* — Chapin IP Law, LLC; Barry W. Chapin, Esq.

(57) ABSTRACT

A system and method for defining the zoom response, or behavior, of a display object independently of other display objects performs a selective zoom response to a zoom level. Selective zoom response provides each display object individual zoom response logic to determine the manner of display at given zoom levels. Accordingly, display object behavior is definable on a per object basis. The zoom function triggers particular operations at a given zoom level for modifying attributes of a display object that affect the visual appearance, thus modifying the zoom behavior of the display object. Since each display object has a different zoom response logic, different display objects respond independently to a particular zoom level as appropriate for the display object. Therefore, the zoom response is object specific since each display object has its own set of attributes and zoom logic affecting those attributes.

23 Claims, 6 Drawing Sheets

SYSTEM AND METHODS FOR SELECTIVE ZOOM RESPONSE BEHAVIOR

BACKGROUND

Graphical User Interfaces (GUI)s are a common manner of exchanging information between a user and a computer in a modern information processing environment. The graphical user interfaces typically follow a well known window-based structure. The window-based structure allows a screen display to present one or more rectangular windows, each having a particular context. An active window from among the available displayed window corresponds to an application that the user is currently exchanging information with. The windows are navigated via a pointing device, such as a mouse, touchpad or trackball, to select, activate, and provide input to the application corresponding to the window, and the keyboard is often employed for free form textual and/or numeric input.

The windows display and receive control and data information through objects or icons displayed in the window. The underlying application arranges the objects as appropriate for displaying and receiving information. The display objects include control objects, which receive input from the user, and passive objects, that present information but do not expect interactive responses. The typical conventional GUI window presents multiple simultaneous display objects, driven by the underlying application. Often, a user will manipulate the objects with the pointing device or keyboard for selecting and changing the appearance of the windows to facilitate data entry or to more readily obtain or receive information from the application. In this manner, GUIs provide an effective interactive communication medium between a user and the computer driven application.

SUMMARY

In a conventional graphical user interface (GUI), users navigate around a set of windows on a display screen. Typically, each of the windows has a zoom function available to enlarge or minimize the display region, thus providing more or less detail to the zoomed area and the display objects therein. Configurations of the invention are based, in part, on the observation that conventional zoom functions treat all display objects of a particular type in the same manner for a given zoom level. In many instances, such a zoom function scales the window area in a graphical manner to enlarge or reduce display objects, and accordingly, adjusting the area over which the zoom applies. In other arrangements, certain display objects may disappear entirely, or may become visible, only at particular zoom levels. For example, many online renderings of geographical maps may enable or disable display of various street, town, and location names depending on the zoom level.

Unfortunately, conventional methods of performing a zoom function ("zooming") in a conventional display suffer from several shortcomings. Conventional configurations treat display objects of a similar type in the same manner, thus the display objects all respond to a zoom function with similar behavior. Therefore, when a map is zoomed, for example, all text of a certain display object type is generally enlarged, reduced, or removed. There is no defined logic or manner of visual representation of a group of disparate types of screen content (e.g. display objects) when a user zooms in or out. Such exemplary cartographic zoom mechanisms, while they may allow for the enablement, disablement, and magnification of existing items, do not provide for object specific treatment by selective code execution based on the zoom level.

In contrast, configurations of the invention substantially overcome the above described shortcomings by providing a system and method for defining the zoom response, or behavior, of a display object independently of other display objects to perform a selective zoom response to a predetermined zoom level. The claimed selective zoom response allows for application code to be executed at specific zoom levels that may be dormant at other zoom levels. This allows the construction of the user interface itself, not just the content, of a display object to be modified based on the user's selected magnification (i.e. zoom level). This method may be employed to cause wholesale reappointment of both the content displayed as well as the display of the controls provided to the user to enact on that content. By allowing each type of content an individual zoom response logic to determine the manner of display at given zoom levels, the user is provided a more user-friendly experience even if several different types of content are displayed in the same screen and/or window. The selective zoom logic may define different rendering options at different zoom thresholds, for example. The zoom function may trigger, or invoke, particular operations at a given zoom level for modifying attributes of a display object that affect the visual appearance, thus modifying the zoom behavior of the display object. Since each display object has a different zoom response logic (zoom logic), the display objects may respond differently to a particular zoom level as appropriate for that display object.

In this manner, configurations of the invention provide a mechanism for defining how each display object responds at a particular zoom level. This selective response may include text, images, control structures, and the UI wrapper, or any visual item within the boundary of the display object. Further, such zoom response logic may define other behavior as well, such as pointer sensitivity, so-called "snaps," drag-and-drop behavior, and other suitable attributes. For example, zooming in on a pen sketch may increase the sketch proportionally, including the stroke size, but zooming in on a screen Post-It® note may show additional text rather than simply linearly scaling the image. Accordingly, display object behavior is definable on a per object basis. Further, the zoom level may further include discrete demarcations, or view contexts, which define threshold zoom levels triggering additional operations, such as when the zoom level transitions to a new range. The zoom response logic may be initialized to initial default values based on the display object type, but remain individually modifiable.

In particular configurations, the object specific selective zoom response is employed in a software graphical user interface (GUI) to enhance the user experience by supplementing the user context with zoom response more appropriate and tailored to each zoomed object. In other words, the same zoom response may not be appropriate for all objects and contexts. Accordingly, not all zoomed objects need respond in the conventional linear scaled manner. Configurations herein may provide, for example, that text be displayed at particular sizes, or abridged or augmented as appropriate. For example, the zoom logic may specify minimum and maximum values for text, beyond which additional or truncated text is shown. Display objects may be responsive to different zoom levels, or zoom distances, based on variables other than the zoom distance. Such variables may include the screen location, the object type, previous user functions, and other aspects of the user context. In a particular configuration, such selective zoom response is applicable to GUI control icons, or so-called "widgets", which developers embed in an application interface, such as buttons, sliders, text boxes, etc. Features of configurations disclosed herein, therefore, allow for the zoom level response and additional control (selective zoom response) to reside within (or specific to) the widget itself, rather than to the collection of widgets in a given screen area. An exemplary arrangement of selective object zoom response based on object specific rules is employed in collaboration software marketed commercially from Adobe® Systems Incorporated, of San Jose, Calif., assignee of the present invention.

In further detail, a method is disclosed for displaying graphical user interface (GUI) screen objects by determining a zoom level of a visual display having display objects, and computing one or more operations corresponding to the determined zoom level, such that the operations are selectively responsive to a predetermined zoom level for affecting behavior of the display object. A zoom processor then applies, based on the zoom level, the identified operations to a display object, in which the identified operations are independent of the operations applied to other display objects. Each of the display objects has a set of attributes that are modifiable by the operations for affecting the behavior of the object. Thus, the operations modify attributes of the display object as a result of applying the computed operations, in which the attributes correspond to, and affect the behavior of, the display object.

Each of the operations affects a particular display object because the display objects maintain an association between the zoom level and the corresponding operation, such that each the operations responsive at a particular zoom level for applying the computed operation as defined by zoom logic. The zoom level corresponds to a view context, the view context indicative of a range of the zoom level. The zoom processor computes, for a particular zoom level, the view context based on the magnitude of the zoom level.

In the exemplary configuration, each of the display objects has a display type, such that the display type determines a set of attributes having default values for the display object. The default values are responsive to the operations, and each display object maintains an independent set of attributes.

Accordingly, each of the display objects exhibits a predetermined zoom response behavior different from (i.e. defined independently in the zoom logic) the zoom response behavior of other display objects, such that the zoom response behavior is computed individually for each of the display objects. In the exemplary arrangement, determining the zoom level includes identifying a change in the current zoom level, computing a new view context based on the zoom level, and invoking display operations corresponding to the new view context, in which the display operations affecting the behavior of the display objects. Identifying a change in the zoom level typically includes receiving a user input indicative of a desired zoom level, such as from a pointing device. Applying, or invoking, the operations therefore selectively modifies the behavior of the display object in response to a predetermined zoom level.

Alternate configurations of the invention include a multi-programming or multiprocessing computerized device such as a workstation, handheld or laptop computer, cellphone or PDA device, or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
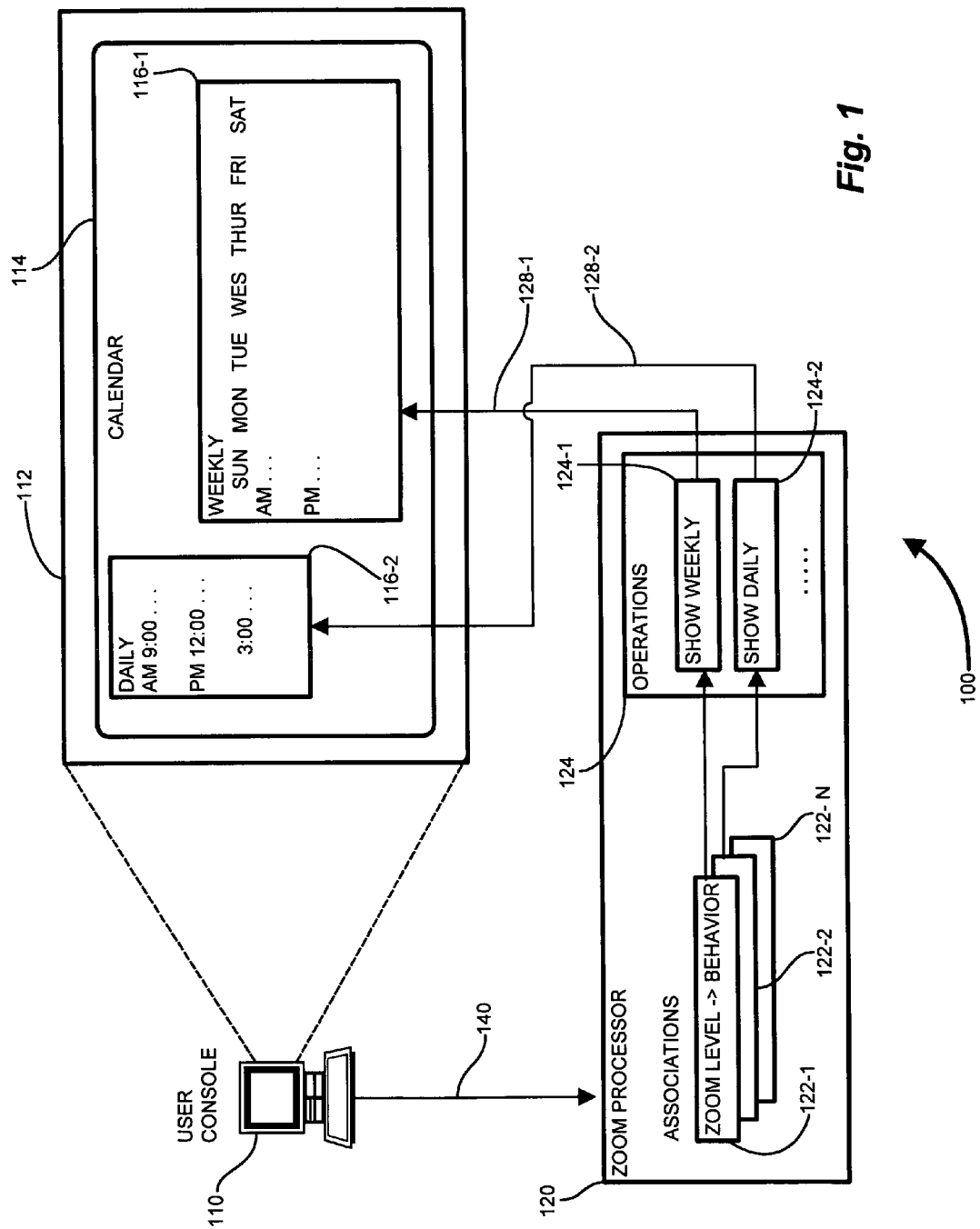
FIG. 1 is a context diagram of an exemplary graphical user interface environment suitable for use with configurations discussed herein.

Configurations discussed further below provide a system and method for defining the zoom response, or behavior, of a display object independently of other display objects to perform a selective zoom response to a predetermined zoom level. By allowing each type of content an individual zoom response logic to determine the manner of display at given zoom levels, the user is provided a more user-friendly experience even if several different types of content are displayed in the same screen and/or window. The selective zoom logic may define different rendering options at different zoom thresholds, for example. The zoom function may trigger, or invoke, particular operations at a given zoom level for modifying attributes of a display object that affect the visual appearance, thus modifying the zoom behavior of the display object. Since each display object has a different zoom response logic (zoom logic), different display objects may respond differently to a particular zoom level as appropriate for the display object. Further, the zoom logic may even be object specific for display objects of the same display object type, since each display object has its own set of attributes and zoom logic affecting those attributes.

Configurations herein allow a user or developer to define selective zoom logic to independently determine the manner in which a display object responds at a particular zoom level. This selective response may include operations affecting text, images, control structures, and the UI wrapper, or any visual item within the boundary of the display object. Further, such zoom response logic may define other behavior as well, such as pointer sensitivity, so-called "snaps," drag-and-drop behavior, and other suitable attributes. Accordingly, display object behavior is definable on a per object basis. Further, the zoom level may further include discrete demarcations, or view contexts, which define threshold zoom levels triggering the operations, such as when the zoom level transitions to a new range. The zoom response logic is typically initialized to initial default values based on the display object type, but remain individually modifiable.

An exemplary configuration discussed herein, therefore, provides a GUI display mechanism for associating a zoom level with a particular type of display behavior and/or display object layout initiated when the zoom level of the display object crosses a threshold from an adjacent zoom level range. In other words, both the appearance and relative arrangement of display object may be responsive to the zoom level. A zoom response processor associates a particular behavior with each display object. The behavior is triggered when the zoom level crosses the threshold from a previous zoom level. Since each display object has it's own set of zoom response parameters, the zoom response may be different for each display object. The zoom behavior is performed by an operation corresponding to the zoom threshold, typically a range of the zoom level which the zoom processor invokes when the zoom level crosses into the threshold. In the exemplary arrangement, the zoom levels are organized into view contexts corresponding to predetermined ranges of zoom levels. Therefore, the view contexts correspond to operations to be triggered, or invoked, when the zoom level crosses a threshold corresponding to the view context. The operations manipulate attributes of the display object to bring about the desired behavior in response to the zoom level. Since each object type has a particular set of attributes, and since the zoom response thresholds (i.e. view context) are independently maintained for each display object, each display object exhibits an object specific response to a particular zoom level. The zoom level and additional control based on the zoom level reside with the display object itself, rather than with the entire display area or window.

FIG. 1 is a context diagram of an exemplary graphical user interface environment suitable for use with configurations discussed herein. Referring to FIG. 1, in a graphical user interface environment 100, a user console 110 such as a user PC, laptop, or other interactive display has an application 112 employing one or more display windows 114. The application window 114 includes one or more display objects 116-1, 116-2 (116 generally) for representing information-conveying entities (i.e. icons) which are the subject of the application 112. In the exemplary arrangement shown, the application 112 is a calendar application and the display objects 116-1, 116-1 are schedules, discussed further below.

The user console 110 is coupled to a zoom processor 120, which is typically part of a larger processing device such as PC or laptop (not specifically shown) on which the user executes the application 112. The zoom processor 120 maintains associations 122-1 . . . 122-N (122 generally) between zoom levels and behavior of the display object. The associations 122 correspond to operations 124 that manipulate the behavior of the display objects 116. Typically, each display object 116 has a corresponding set of associations 122 for triggering various operations 124-1 . . . 124-2 (124 generally) at independent zoom level thresholds. Further, each display object 116 may have it's own set of operations 124, allowing behavior that is specific to that object 116-N when the associations 122 trigger an operation 124.

In the course of performing (i.e. executing) the application 112, a user issues a zoom level input 140 via any suitable means, such as a mouse, touchpad, trackball, or other pointing device. The zoom level input 140 represents a magnitude of the zoom applied to the application window 114, and hence to display objects 116 within the window. While conventional zoom functions apply similar zoom processing to some or all objects 116 in the window 114, such as linear scaling, configurations discussed herein apply a predetermined operation 124 based on the zoom specific association 122. Accordingly, the zoom processor 120 identifies associations 122 triggered by, or corresponding to, the zoom level specified by the zoom level input 140. The triggered association 122 is indicative of a particular behavior of a corresponding display object 116. The association 122 maps the behavior to a particular operation 124 for bringing about the specified object specific behavior.

The zoom processor 120 then executes the mapped operations 124 to cause the behavioral change to the display object 116 in question, as shown by arrows 128-1 and 128-1. In the example shown, the display objects 116 are schedules for displaying a calendar. The zoom level input 140 triggers an association for a weekly display 116-1 and a daily display 116-2, respectively. Therefore, the zoom level displays a weekly calendar at a particular zoom level, and displays a daily calendar at a lower zoom level (i.e. as the user zooms in, the display shows the more granular daily calendar). Accordingly the triggered (invoked) operation display daily 124-2 causes a daily display for object 116-2, while the display weekly operation 124-1 causes the weekly display 116-1. In the exemplary configuration, the claimed selective zoom response is performed by invoking application code to be executed at specific zoom levels that may be dormant at other zoom levels. This allows the construction of the user interface itself; not just the content, of a display object to be modified based on the user's selected magnification (i.e. zoom level). This approach may therefore be employed to cause wholesale reappointment of both the content displayed as well as the display of the controls provided to the user to enact on that content. Alternate arrangements may provide other mechanisms for selective zoom response embedded in or associated with the display object itself, rather than with the entire window or screen area.

Figure 2:
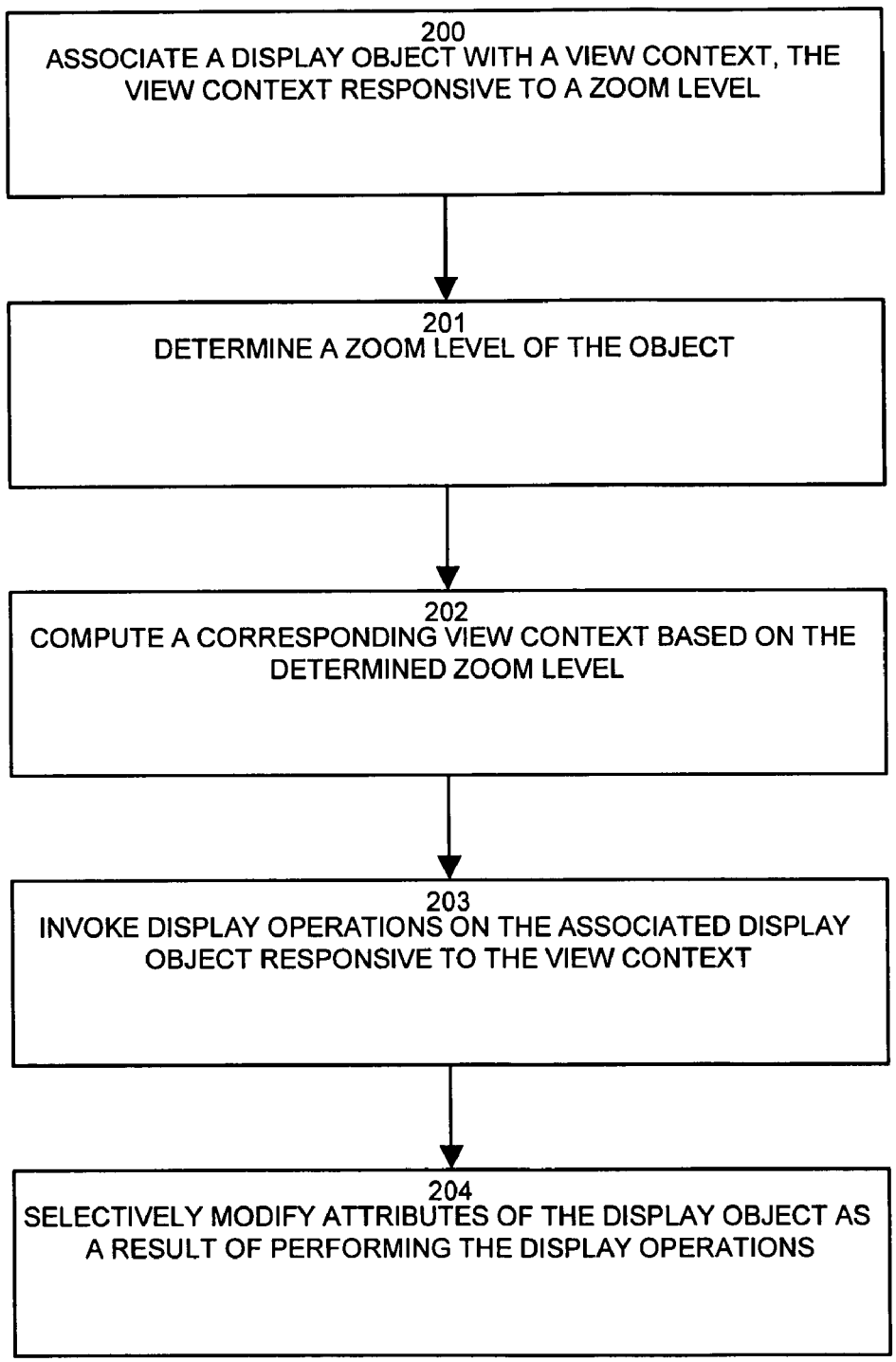
FIG. 2 is a flowchart of zoom responsive display object behavior in the environment of FIG. 1.

FIG. 2 is a flowchart of zoom responsive display object 116 behavior in the environment of FIG. 1. Referring to FIGS. 1 and 2, at step 200, the method for displaying graphical user interface (GUI) screen objects as defined herein includes associating a display object 116 with a view context, in which the view context is responsive to a zoom level, and determining the zoom level of the object, as depicted at step 201. The zoom level is typically received from a user input device, such as a mouse, trackball, keyboard, or other pointing device. The zoom level is often represented as a gradual continuum of increasing size range (zoom in) or decreasing size and increasing scope (zoom out). However, it is one feature of the claimed configuration to provide other than simply uniform size scaling in response to the zoom level. Each display object 116 has a plurality of view contexts determined by the zoom level. Typically, the view context represents discrete ranges along a continuum defined by the zoom level, i.e. one view context covers 0-30%, another from 31-70%, and a third from 71-100%, for example. The zoom processor 120 computes a corresponding view context based on the determined zoom level, as depicted at step 202 and identifies, via the associations 122, behavior of a particular display object 116 at the determined zoom level.

The zoom processor 120, at step 203, invokes display operations 124 on the associated display object 116 responsive to the view context based on the associations 122. The invoked operations 124 selectively modify attributes of the display object 116 as a result of performing the display operations 124, thus effecting the desired object 116 behavior, as disclosed at step 204. The display operations may, for example, cause a daily 124-1 or weekly 124-2 display of a calendar object 116-1, 116-2, respectively. Further, the same zoom level may generate different operations for the display objects 116. For example, one calendar 116-1 may display a daily view at a 31% zoom, while another calendar changes (zooms) from a weekly to a daily view at a 71% zoom level.

Figure 3:
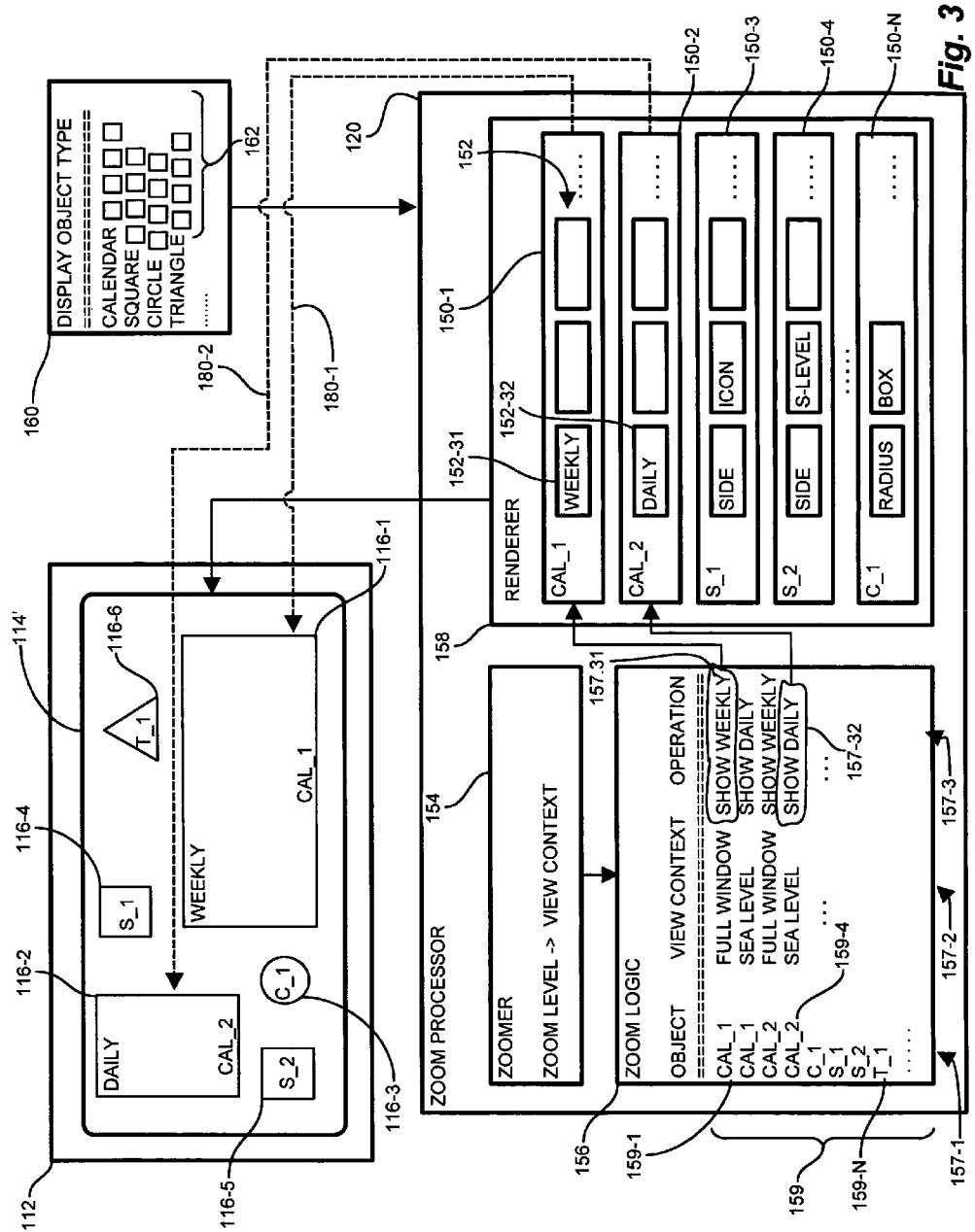
FIG. 3 is a block diagram of a graphical user interface suitable for use with zoom processing as described herein.

FIG. 3 is a block diagram of a graphical user interface suitable for use with zoom processing as described herein. Referring to FIGS. 1-3, an exemplary arrangement of the zoom processor 120 is shown. Alternate arrangements of a zoom processor 120 for associating independent selective zoom response with individual display objects 116 as claimed herein will be apparent to those skilled in the art. In the exemplary configuration in FIG. 3, another exemplary display screen 114' driven from the application 112 is shown. The display 114' includes additional display objects including circle 1 116-3, square 1 and 2 116-4, 116-5, and triangle 116-6. Each of the display objects 116 has a display object type 160. The display object type 160 determines attributes 162 (discussed further below) of the display object 116 and sets reasonable defaults that are subsequently modifiable by the methods discussed herein. For example, the calendar display object type has attributes for daily or weekly display, a circle has a radius attribute, etc.

The zoom processor 120 illustrates a particular implementation of the associations and triggered operations, and includes a zoomer 154, zoom logic 156, and a renderer 158. The zoomer 154 computes a view context from a zoom level specified by a user input 140, typically a numerical percentage or a so-called "dragged" rectangular outline from a mouse. The view context is a discrete characterization of the appearance of the display object, such as iconic, fit in window, or "sea level" (i.e. normal), discussed further below. The zoom logic 156 identifies, for each display object 116, the various view contexts applicable to that display object 116 and the corresponding operation to invoke at that view context. The zoom logic 156 may take the form of a table lookup, as illustrated, or may involve other programmed logic. In the exemplified zoom logic, each entry 159-N lists a display object 157-1, a view context 157-2, and the operation to invoke 157-3 to bring about the desired screen result for displaying the object 116 according to the appropriate zoom response.

The renderer 158 has an entry 150-1 . . . 150-N (150 generally) for maintaining a set of attributes 152-1 . . . 152-N (152 generally) for each display object 116. The attributes 152 specify the rendered, or currently displayed, form of the display object at the current zoom level. The operations 157-3, therefore, manipulate the attributes 152 to result in the proper rendering, such as weekly or daily display. Each of the display objects 116 has a corresponding entry 150 including an independent set of attributes 152. As indicated above, the display object type 160 enumerates (lists) the attributes 152 for each object type, and also sets initial default values 162, which may be, for example, sea level. Subsequent user zoom inputs 140 direct the zoom processor 120 to modify the attributes for the desired zoom response, also discussed in further detail below. For example, at a particular zoom level, the zoom logic entry 159-1 for calendar display object CAL_1 116-1, the view context "full window" triggers the "show weekly" 157-31 operation to modify the attribute "weekly" to display a weekly calendar. Another entry 159-4 specifies a sea level view context to trigger a "show daily" 157-32 operation for listing a daily calendar. Display object CAL_2 116-2, therefore, maintains separate zoom logic which may be responsive at different or similar zoom levels, and may invoke similar or different operations 157-3.

Figure 4:
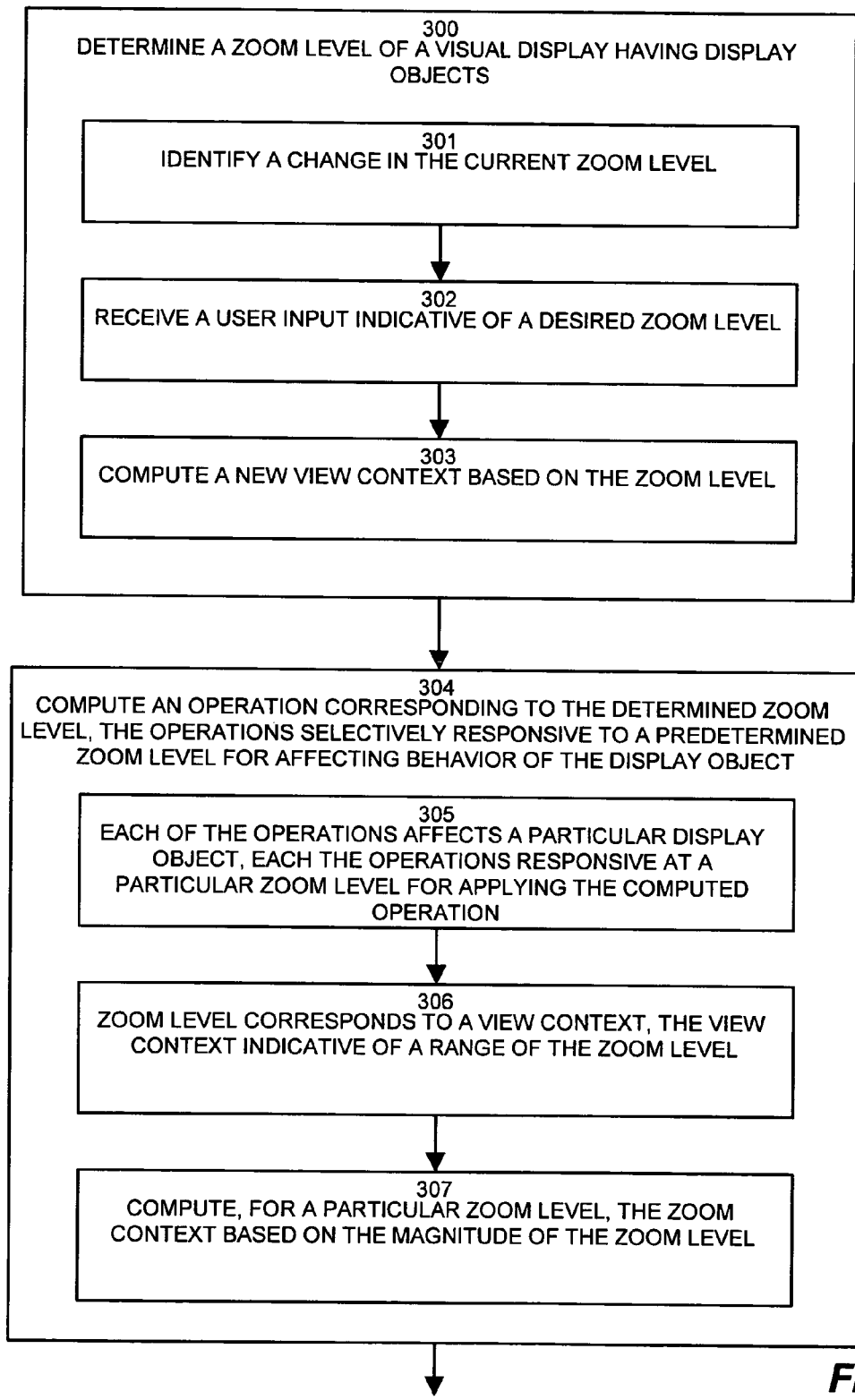
FIGS. 4-6 are a flowchart of zoom processing in the exemplary GUI of FIG. 3.
Figure 5:
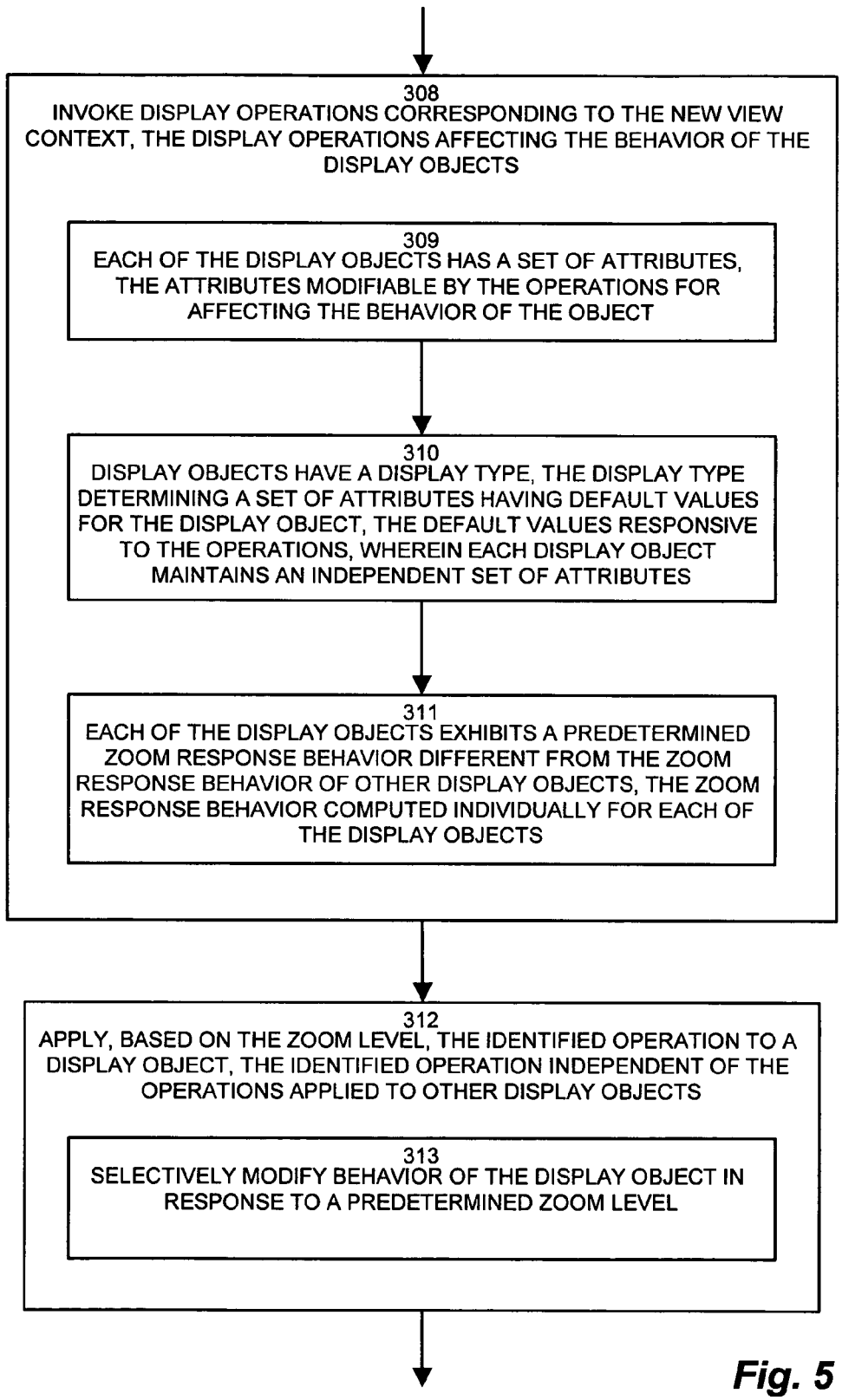
Figure 6:
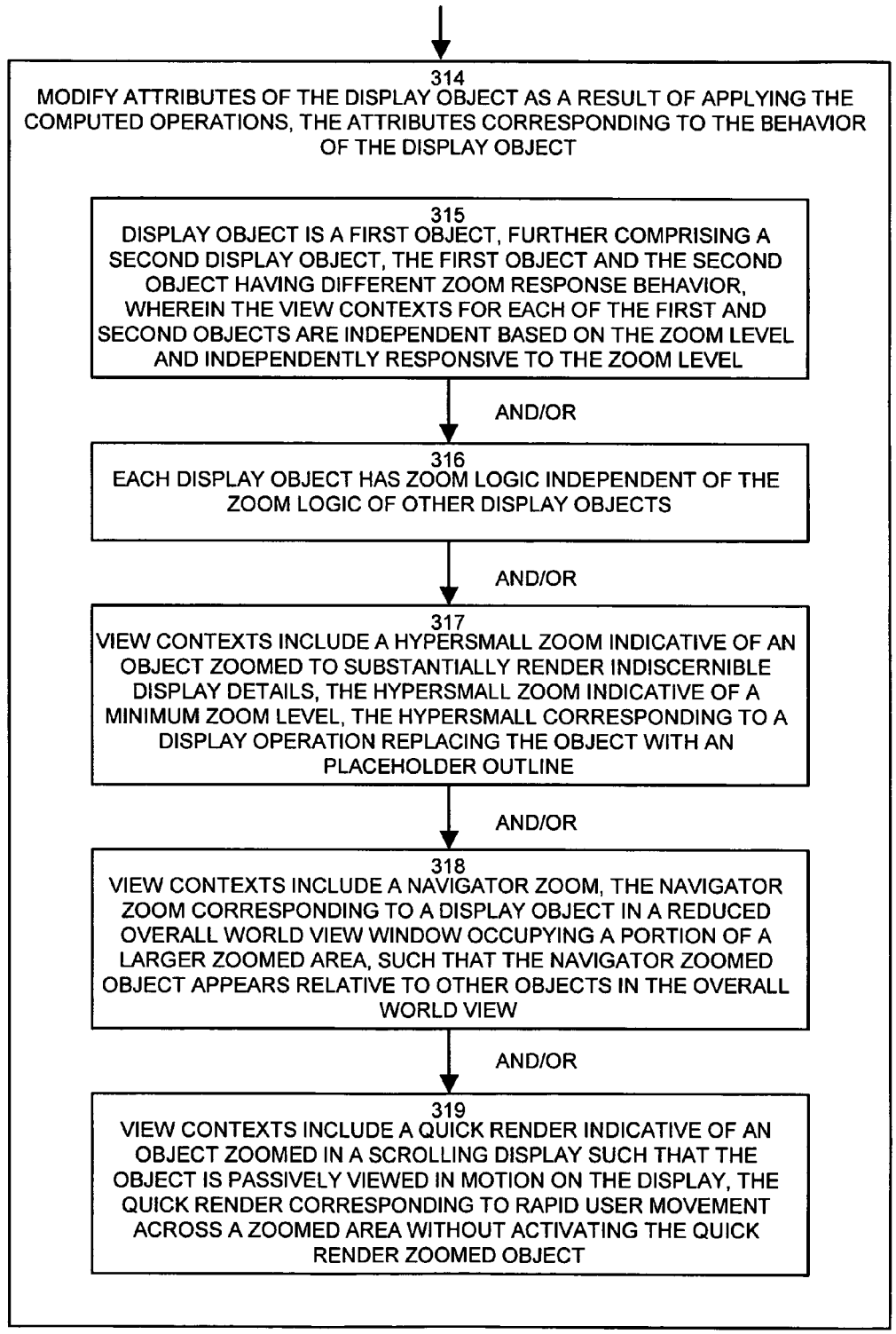

FIGS. 4-6 are a flowchart of zoom processing in the exemplary GUI of FIG. 3. Referring to FIGS. 1 and 3-6, at step 300, the zoomer 154 in the zoom processor 120 determines a zoom level of the visual display 114' having display objects 116, as depicted at step 300. The zoom processor 120 identifies a change in the current zoom level, as shown at step 301. Typically, identifying a change in the zoom level further includes receiving a user input 140 indicative of a desired zoom level, as depicted at step 302, such as when the user is navigating the screen and selects an object 116 to zoom in or out on. At step 303, the zoomer 154 computes the new view context based on the zoom level received from the user. The view context identifies a particular user context or setting, and may include other factors in addition to the zoom level, such as the manner in which the user is navigating the screen and whether the user is actively invoking the display object or passively viewing.

Exemplary view contexts include the following: a hypersmall view context indicates that the user has zoomed substantially out so as to render the display object 116 mostly indiscernible such as a dot. In such a context, the object may be shown as a gray box, in a so-called "reaping" function, or simply as an outline, depending on the displayed size. An iconic view context indicates that the display is small, but still discernable in roughly the size of a standard icon in the current operating system (e.g. a 64*64 pixel shape in Windows®). An iconic toolbar is similar, and lists a series of display objects 116 with the expectation of further instantiating one or more of them. A sea level view context indicates a normal size exhibiting sufficient detail to fulfill the display object's purpose, and may typically be employed as a default. A fit-in-window view context sizes the display object 116 to the limits of the current window, or, optionally, the entire screen. An oversize view context expands the object to larger than the window and is typically employed to drill down into the display object, thus representing a substantial zoom level (>100%, for example).

Further, users may often navigate around a work area substantially larger than the screen. The screen is often scrolled as a window over the work area in such instances. A navigator pod view context includes a small window snapshot of the entire navigable area, and displays the objects within the snapshot accordingly. A quick render view context indicates that a user is passing over a display object, such as scrolling. In this context, the display object is not invoked by the user, so a fast efficient passive display is appropriate. For example, a user may be navigating from far left to far right in a rapid scrolling manner, or may exhibit a so-called "hulk hop," characterized by traversing over a large portion of the overall work area (as if one was "jumping" out of the page and landing back down).

In the exemplary configuration, the zoomer 154 computes or identifies the view context from the zoom level. This may simply be a subrange mapping from the zoom level (i.e. "splits up" the zoom level range) or may take other forms. The zoom processor 120 then computes an operation 124 corresponding to the determined zoom level, in which the operations 124 are selectively responsive to a predetermined zoom level for affecting behavior of the display object 116, as shown at step 304. As indicated above, based on the resulting view context 157-2, the zoom logic 156 is invoked to identify an operation 157-3 for each display object. As shown at step 305, each of the operations 157-3 affects a particular display object 116, such that each of the operations 124 are responsive at a particular zoom level for applying the computed operation 124, corresponding to each entry 159 in the zoom logic 156. Based on input from the zoomer 154, each zoom level corresponds to a view context, in which the view context is indicative of a range of the zoom level input by the user, as depicted at step 306. Therefore, computing the resulting operation 124 includes invoking the zoomer to compute, for a particular zoom level 140, the view context based on the magnitude of the zoom level, as shown at step 307.

At step 308, the zoom processor 120 invokes the display operations 157-3 corresponding to the new view context, in which the display operations 124 affect the behavior of the display objects 116. Each of the display objects 116 has a set 1 . . . 150-N (150 generally) of attributes 152, such that the attributes 152 are modifiable by the operations 157-3 for affecting the behavior of the object 116, as depicted at step 309. The attributes 152 are defined by the display type 160 of the object 116, in which each of the display objects has a display type 160, such that the display type determines the set of attributes 150 having default values 162 for the display object 116, the default values being responsive to the operations, and each display object 116 maintains an independent set 150 of attributes 152, as disclosed at step 310. The renderer 158 maintains and modifies the attribute sets 150-N for each display object 116. For example, continuing the example above, the entry 159-1 triggers a show weekly operation 157-31 to set the weekly attribute 152-31 in the corresponding attribute set 150-1 for calendar 1 (CAL_1) 116-1. Similarly, the operation show daily 157-32, for display object 116-2, sets the daily attribute 152-32 in the attribute set 150-2 for calendar 2 (CAL_2) 116-2, and applied to the display objects 116-1, 116-2 as shown by dotted lines 180-1 and 180-2 respectively. Since the zoom logic maintains entries 152 for each object and view context, each of the display objects 116 is operable to exhibit a predetermined zoom response behavior different from the zoom response behavior of other display objects 116, such that the zoom response behavior is computed individually for each of the display objects 116, as disclosed at step 311.

At step 312, the renderer 158 applies, based on the zoom level, the identified operation 124 to the display object 116, such that the identified operation 124 is independent of the operations applied to other display objects 116, as shown by dotted lines 180-1, 180-2. Therefore, applying the operations 157-3 further includes selectively modifying the behavior of the display object 116 in response to a predetermined zoom level, as depicted at step 313. The zoom logic 156 codifies the predetermined zoom level and enumerates the corresponding operation 157-3 for resulting in the desired behavior.

The renderer 158 maintains the attributes 152 modified by the operations for resulting in the desired zoom response behavior. Accordingly, at step 314, the renderer modifies the attributes 152 of the display object 16 as a result of applying the computed operation 157-3, in which the attributes 152 correspond to the behavior of the display object. In the exemplary configuration, the display object 116-1 is a first object, further comprising a second display object 116-2, the first object and the second object having different zoom response behavior, such that the view contexts 157-2 for each of the first and second objects 116-1, 116-2 are independent based on the zoom level and independently responsive to the zoom level, as depicted at step 315. Each display object 116 has zoom logic independent of the zoom logic of other display objects 116, as depicted at step 316, because each object 116 has independent entries 159 in the zoom logic 156. As indicated above, the view contexts 157-2 applicable to the attributes modified by the renderer 158 include a hypersmall zoom indicative of an object zoomed to substantially render indiscernible display details, the hypersmall zoom indicative of a minimum zoom level, and corresponding to a display operation replacing the object with an placeholder outline, as shown at step 317. Further, the view contexts 157-2 include a navigator zoom, in which the navigator zoom corresponds to a display object in a reduced overall world view window occupying a portion of a larger zoomed area, such that the navigator zoomed object appears relative to other objects in the overall world view, as depicted at step 318. The view contexts 157-2 further include a quick render indicative of an object zoomed in a scrolling display such that the object is passively viewed in motion on the display, in which the quick render view context corresponds to rapid user movement across a zoomed area without activating the quick render zoomed object, as depicted at step 319. Other view contexts as described above are available and will be apparent to those of skill in the art.

Those skilled in the art should readily appreciate that the programs and methods for zoom processing as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for zoom processing has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for displaying graphical user interface (GUI) screen objects comprising:

determining a zoom level of a display object in a visual display having display objects, the zoom level corresponding to a view context, the view context indicative of a range of the zoom level, determining the zoom level further comprising:

identifying a change in the current zoom level;

computing a new view context based on the zoom level; and invoking display operations corresponding to the new view context, the display operations affecting the behavior of the display objects by executing code specific to the view context, the executed code dormant at other view contexts, further comprising;
computing, for a particular zoom level, the view context based on the magnitude of the zoom level, the view context identified by discrete thresholds of zoom levels such that the view context triggers a rendering operation;
identifying the display operation corresponding to the determined view context, the display operation selectively responsive to a predetermined zoom level for affecting behavior of the display object, the predetermined zoom level defined between thresholds of zoom levels defining the view context, the display operation being a rendering operation for a display object, each rendered display object having a set of rendering operations and a zoom level, further comprising:
defining a set of view contexts for each object, each view context defined by a discrete subrange of the zoom level;
defining, for each of the view contexts, a rendering operation, the view context triggering the rendering operation when the zoom level crosses the zoom threshold into the subrange defining the view context;
receiving a zoom selection for a display object, the zoom selection defining the zoom level;
determining the view context based on the subrange of the zoom level defined by the received zoom selection;
mapping, based on the determined view context and the display object for which the zoom was received, the rendering operation defined for the view context; and
invoking the mapped rendering operation for rendering the display object; the rendering operations include a hypersmall view context indicating that the user has zoomed substantially out so as to render the display object substantially indiscernible, an iconic view context indicating that the display is reduced but discernable and having a size of standard icon in the current operating system, an iconic toolbar having a series of iconic display objects, and listing a series of display objects, a sea level view context indicating a normal size exhibiting sufficient detail to fulfill the display object's purpose, a fit-in-window view context sizing the display object to the limits of the current window or the entire screen, and an oversize view context expanding the display object to larger than the window; and
selectively applying, based on the computed view context, the identified display operation to a display object of the display objects, the display operation applied by mapping the view context to the triggered rendering operation, the rendering operation independent of rendering operations applied to other display objects, the zoom response behavior computed individually for each of the display objects, the rendering operation triggered by the zoom based on the display object and independent of the window or screen on which the display object is displayed.

2. The method of claim 1 wherein each of the display objects has a set of attributes, the attributes modifiable by the operations for affecting the behavior of the object.

3. The method of claim 2 wherein each of the operations affects a particular display object, further comprising maintaining an association between the zoom level and the corresponding operation, each the operations responsive at a particular zoom level for applying the computed operation.

4. The method of claim 1 wherein the display object has attributes, further comprising modifying attributes of the display object as a result of applying the computed operations, the attributes corresponding to the behavior of the display object.

5. The method of claim 4 wherein the display objects have a display type, the display type determining a set of attributes having default values for the display object, the default values responsive to the operations, wherein each display object maintains an independent set of attributes.

6. The method of claim 1 wherein applying the operations further comprises selectively modifying behavior of the display object in response to a predetermined zoom level.

7. The method of claim 6 wherein the display object is a first object, further comprising a second display object, the first object and the second object having different zoom response behavior, wherein the view contexts for each of the first and second objects are independent based on the zoom level and independently responsive to the zoom level.

8. The method of claim 1 wherein the view contexts include a hypersmall zoom indicative of a minimum zoom level, the hypersmall corresponding to a display operation replacing the object with an placeholder outline.

9. The method of claim 1 wherein the view contexts include a navigator zoom, the navigator zoom corresponding to a display object in a reduced overall world view window occupying a portion of a larger zoomed area, such that the navigator zoomed object appears relative to other objects in the overall world view.

10. The method of claim 1 wherein the view contexts include a quick render indicative of an object zoomed in a scrolling display such that the object is passively viewed in motion on the display, the quick render corresponding to rapid user movement across a zoomed area without activating the quick render zoomed object.

11. The method of claim 1 wherein the rendering operations include at least one of:
a hypersmall zoom indicative of an object zoomed to substantially render indiscernible display details, the hypersmall zoom indicative of a minimum zoom level, the hypersmall corresponding to a display operation replacing the object with an placeholder outline;
a navigator zoom, the navigator zoom corresponding to a display object in a reduced overall world view window occupying a portion of a larger zoomed area, such that the navigator zoomed object appears relative to other objects in the overall world view; and
a quick render indicative of an object zoomed in a scrolling display such that the object is passively viewed in motion on the display, the quick render corresponding to rapid user movement across a zoomed area without activating the quick render zoomed object.

12. The method of claim 1 wherein the rendering operations include view contexts corresponding to a rendering operation for a calendar display object for showing a monthly view of an entire month, a show weekly rendering operation for rendering a current week, and a show daily rendering operation for listing a daily calendar.

13. The method of claim 1 further comprising maintaining associations between zoom levels and behavior of the display object, the associations corresponding to display operations that manipulate the behavior of the display objects such that each display object has a corresponding set of associations for triggering the independent display operation at each zoom level.

14. A method for defining different zoom behavior for respective display objects comprising:
displaying a screen having a plurality of display objects;

receiving a zoom input from a user, the zoom input indicative of at least a subset of the plurality of display objects, the zoom input including a zoom level corresponding to a view context, the view context representing a discrete range of zoom input indicative of a range of the zoom level and identified by discrete thresholds of zoom levels;

determining a view context from the zoom input, the view context indicative of a perceived user context on a screen display, further comprising:

computing, for a particular zoom level, the view context based on the magnitude of the zoom level, the particular zoom level defined between thresholds of zoom levels defining the view context such that the view context triggers a rendering operation;

maintaining associations between the zoom levels and behavior of the display object, the associations corresponding to display operations that manipulate the behavior of the display objects such that each display object has a corresponding set of associations for triggering the display operation at each zoom level, computing the zoom level further comprising:

identifying a change in the current zoom level;

computing a new view context based on the zoom level; and invoking display operations corresponding to the new view context, the display operations affecting the behavior of the display objects by executing code specific to the view context, the executed code dormant at other view contexts;

selectively computing, based on the associations, for each of a plurality of display objects, display operations corresponding to the particular display object in response to the computed view context, the view context indicative of predetermined display operations for the display object independent of the others of the plurality of display objects;

determining attributes of the display objects modified by the computed display operations, the display operation being a rendering operation for a display object, each rendered display object having a set of rendering operations and a zoom level, further comprising:

defining a set of view contexts for each object, each view context defined by a discrete subrange of the zoom level;

defining, for each of the view contexts, a rendering operation, the view context triggering the rendering operation when the zoom level crosses the zoom threshold into the subrange defining the view context;

receiving a zoom selection for a display object, the zoom selection defining the zoom level;

determining the view context based on the subrange of the zoom level defined by the received zoom selection;

mapping, based on the determined view context and the display object for which the zoom was received, the rendering operation defined for the view context; and invoking the mapped rendering operation for rendering the display object; the rendering operations include a hypersmall view context indicating that the user has zoomed substantially out so as to render the display object substantially indiscernible, an iconic view context indicating that the display is reduced but discernable and having a size of standard icon in the current operating system, an iconic toolbar having a series of iconic display objects, and listing a series of display objects, a sea level view context indicating a normal size exhibiting sufficient detail to fulfill the display object's purpose, a fit-in-window view context sizing the display object to the limits of the current window or the entire screen, and an oversize view context expanding the display object to larger than the window; and performing the computed display operations on the determined attributes, the display operation applied by mapping the view context to the triggered rendering operation via the associations, the zoom response behavior computed individually for each of the display objects, the rendering operation triggered by the zoom based on the display object and independent of the window or screen on which the display object is displayed.

15. A computing device for displaying graphical user interface (GUI) screen objects comprising:

a zoomer operable to determine a zoom level of a visual display having display objects, the zoom level corresponding to a view context, the view context indicative of a range of the zoom level, and identified by discrete thresholds of zoom levels, determining the zoom level further comprising:

maintaining associations between the zoom levels and behavior of the display object, the associations corresponding to display operations that manipulate the behavior of the display objects such that each display object has a corresponding set of associations for triggering the display operation at each zoom level;

identifying a change in the current zoom level;

computing a new view context based on the zoom level; and invoking operations corresponding to the new view context, the display operations affecting the behavior of the display objects by executing code specific to the view context, the executed code dormant at other view contexts;

zoom logic operable to compute display operation corresponding to the determined zoom level, the operations selectively responsive to a predetermined zoom level for affecting behavior of the display object, the zoomer further operable to, compute, for a particular zoom level, the view context based on a magnitude of the zoom level, the predetermined zoom level defined between thresholds of zoom levels defining the view context such that the view context triggers a rendering operation the display operation being a rendering operation for a display object, each rendered display object having a set of rendering operations and a zoom level, further comprising:

defining a set of view contexts for each object, each view context defined by a discrete subrange of the zoom level;

defining, for each of the view contexts, a rendering operation, the view context triggering the rendering operation when the zoom level crosses the zoom threshold into the subrange defining the view context;

receiving a zoom selection for a display object, the zoom selection defining the zoom level;

determining the view context based on the subrange of the zoom level defined by the received zoom selection;

mapping, based on the determined view context and the display object for which the zoom was received, the rendering operation defined for the view context; and invoking the mapped rendering operation for rendering the display object; the rendering operations include a hypersmall view context indicating that the user has zoomed substantially out so as to render the display object substantially indiscernible, an iconic view context indicating that the display is reduced but discernable and having a size of standard icon in the current operating system, an iconic toolbar having a series of iconic display objects, and listing a series of display objects, a sea level view context indicating a normal size exhibiting sufficient detail to fulfill the display object's purpose, a fit-in-window view context sizing the display object to the limits of the current window or the entire screen, and an oversize view context expanding the display object to larger than the window; and a renderer operable to selectively apply, based on the computed view context and the maintained associations, the identified display operation to a display object, the identified display operation independent of the operations applied to other display objects, the display operation applied by mapping the view context to the triggered rendering operation, the zoom response behavior computed individually for each of the display objects, the rendering operation triggered by the zoom based on the display object and independent of the window or screen on which the display object is displayed.

16. The computing device of claim 15 further comprising, for each of the display objects, a set of attributes, the attributes modifiable by the operations for affecting the behavior of the object.

17. The computing device of claim 16 wherein each of the operations is operable to affect a particular display object, the zoom logic further operable to maintain an association between the zoom level and the corresponding operation, each the operations responsive at a particular zoom level for applying the computed operation.

18. A computer program product having a non-transitive computer readable storage medium operable to store computer program logic embodied in computer program code encoded thereon that, when executed, cause the computer to perform a method for displaying objects in a graphical user interface, the method comprising:

determining a zoom level of a visual display having at least one display object;

maintaining associations between the zoom levels and behavior of the display object, the associations corresponding to display operations that manipulate the behavior of the display objects such that each display object has a corresponding set of associations for triggering the independent display operation at each zoom level;

identifying a display operation corresponding to the determined zoom level, the operation selectively responsive to a predetermined zoom level for affecting behavior of the display object, the zoom level corresponding to a view context, the view context indicative of a range of the zoom level;

computing, for a particular zoom level, the view context based on the magnitude of the zoom level, the view context identified by discrete thresholds of zoom levels, the particular zoom level defined between thresholds of zoom levels defining the view context such that the view context triggers a rendering operation; the display operation being a rendering operation for a display object, each rendered display object having a set of rendering operations and a zoom level, further comprising:

defining a set of view contexts for each object, each view context defined by a discrete subrange of the zoom level;

defining, for each of the view contexts, a rendering operation, the view context triggering the rendering operation when the zoom level crosses the zoom threshold into the subrange defining the view context;

receiving a zoom selection for a display object, the zoom selection defining the zoom level;

determining the view context based on the subrange of the zoom level defined by the received zoom selection;

mapping, based on the determined view context and the display object for which the zoom was received, the rendering operation defined for the view context; and invoking the mapped rendering operation for rendering the display object; the rendering operations include a hyper-small view context indicating that the user has zoomed substantially out so as to render the display object substantially indiscernible, an iconic view context indicating that the display is reduced but discernable and having a size of standard icon in the current operating system, an iconic toolbar having a series of iconic display objects, and listing a series of display objects, a sea level view context indicating a normal size exhibiting sufficient detail to fulfill the display object's purpose, a fit-in-window view context sizing the display object to the limits of the current window or the entire screen, and an oversize view context expanding the display object to larger than the window;

selectively applying, based on the computed view context, the identified display operation to the display object, the display operation applied by mapping the view context to the triggered rendering operation, the identified display operation independent of the operations applied to other display objects, the zoom response behavior computed individually for each of the display objects;

identifying a change in the current zoom level;

computing a new view context based on the zoom level; and invoking display operations corresponding to the new view context, the display operations affecting the behavior of the display object, the rendering operation triggered by the zoom based on the display object and independent of the window or screen on which the display object is displayed.

19. The method of claim 18, further comprising:

identifying a zoom threshold associated with a display object;

receiving a zoom level indicative of a transition across the zoom threshold;

determining an operation associated with the zoom threshold; and invoking the determined operation.

20. The method of claim 19 wherein the zoom threshold identifies a zoom context indicative of a subset of a zoom range; further comprising:

identifying a set of operations denoting behavior specific to the display object;

associating a particular behavior associated with the zoom context, the associated behavior triggered by the zoom level crossing the zoom threshold into a range defining the zoom context.

21. The method of claim 19 further comprising:

associating a set of operations with a zoom context defined by the zoom threshold, each zoom context corresponding to a subrange of the zoom level;

determining the operation upon the zoom level transitioning into the zoom context defined by the threshold, the display object being a first display object;

receiving a second zoom level corresponding to a second display object, the second display object having a second set of operations; and triggering an associated one of the second set of operations corresponding to a second zoom threshold defining a second zoom context.

22. A method for modifying rendered appearance of computer display screen objects comprising:

receiving a first zoom level indicative of a zoom magnitude to apply to a display object on a computer display screen, the zoom level corresponding to a view context, the view context indicative of a range of the zoom level within a minimum and maximum continuum of zoom levels;

computing, for a particular zoom level, the view context based on the magnitude of the zoom level, the magnitude of the zoom level determined to be between discrete thresholds of zoom levels such that the view context triggers a rendering operation;

maintaining associations between the zoom levels and behavior of the display object, the associations corresponding to display operations that manipulate the behavior of the display objects such that each display object has a corresponding set of associations for triggering the independent display operation at each zoom level;

identifying, by mapping the associations, a display operation corresponding to the view context, the operation selectively responsive to the identified view context for affecting behavior of the display object; the display operation being a rendering operation for a display object, each rendered display object having a set of rendering operations and a zoom level, further comprising:

defining a set of view contexts for each object, each view context defined by a discrete subrange of the zoom level;

defining, for each of the view contexts, a rendering operation, the view context triggering the rendering operation when the zoom level crosses the zoom threshold into the subrange defining the view context;

receiving a zoom selection for a display object, the zoom selection defining the zoom level;

determining the view context based on the subrange of the zoom level defined by the received zoom selection;

mapping, based on the determined view context and the display object for which the zoom was received, the rendering operation defined for the view context; and invoking the mapped rendering operation for rendering the display object; the rendering operations include a hyper-small view context indicating that the user has zoomed substantially out so as to render the display object substantially indiscernible, an iconic view context indicating that the display is reduced but discernable and having a size of standard icon in the current operating system, an iconic toolbar having a series of iconic display objects, and listing a series of display objects, a sea level view context indicating a normal size exhibiting sufficient detail to fulfill the display object's purpose, a fit-in-window view context sizing the display object to the limits of the current window or the entire screen, and an oversize view context expanding the display object to larger than the window;

selectively applying, based on the zoom level, the identified display operation to a display object of the display objects, the display operation applied by mapping the view context to the triggered rendering operation, the display operation independent of operations applied to other display objects such that different display object each have a corresponding view context, the rendering operation triggered by the zoom based on the display object and independent of the window or screen on which the display object is displayed;

receiving a second zoom level indicative of a zoom magnitude for applying to a second display object;

determining that the second zoom level crosses a zoom threshold defining a second view context for applying to the second display object; and applying, to the second display object, a rendering operation corresponding to the second view context upon the zoom level crossing the zoom threshold of the second view context, the operations independent of view contexts of other display objects in the computer display screen.

23. The method of claim 22 wherein the zoom threshold identifies a zoom context indicative of a subset of a zoom range; further comprising:

identifying a set of operations denoting behavior specific to the display object;

associating a particular behavior associated with the zoom context, the associated behavior triggered by the zoom level crossing the zoom threshold into a range defining the zoom context.

* * * * *